US006629397B1

(12) United States Patent
Focke et al.

(10) Patent No.: US 6,629,397 B1
(45) Date of Patent: Oct. 7, 2003

(54) MACHINE MONITORING APPARATUS CAPABLE OF INCORPORATION INTO A NETWORK

(75) Inventors: Heinz Focke, Verden (DE); Hans-Jürgen Bretthauser, Bremen (DE); Jörg Kaluschke, Achim (DE)

(73) Assignee: Focke & Co. (GmbH), Verden (DE)

( * ) Notice: Subject to any disclaimer, the term of this patent is extended or adjusted under 35 U.S.C. 154(b) by 0 days.

(21) Appl. No.: 09/555,952

(22) PCT Filed: Oct. 16, 1998

(86) PCT No.: PCT/EP98/06561

§ 371 (c)(1),
(2), (4) Date: Jun. 6, 2000

(87) PCT Pub. No.: WO99/29191

PCT Pub. Date: Jun. 17, 1999

(30) Foreign Application Priority Data

Dec. 4, 1997 (DE) .......................................... 197 53 704

(51) Int. Cl.[7] .............................................. B65B 57/00
(52) U.S. Cl. ........................................... 53/55; 53/167
(58) Field of Search .................. 53/55, 167; 348/208.1, 348/208.2, 208.13, 208.14, 352; 359/110, 113

(56) References Cited

U.S. PATENT DOCUMENTS

| 4,344,520 A | 8/1982 | Czoch et al. ............... 198/347 |
| 4,656,509 A * | 4/1987 | Matsuyama et al. ....... 165/11.2 |

(List continued on next page.)

FOREIGN PATENT DOCUMENTS

| DE | 3801388 | 7/1988 |
| DE | 4212676 | 10/1992 |

(List continued on next page.)

OTHER PUBLICATIONS

PCT International Search Report Jun. 14, 1999.
PCT International Preliminary Examination Report Mar. 8, 2000.

*Primary Examiner*—Scott A. Smith
*Assistant Examiner*—Chukwurah Nathaniel
(74) *Attorney, Agent, or Firm*—Abelman, Frayne & Schwab (57) ABSTRACT

The invention relates to a machine, especially a machine for packing or producing (cigarettes), which has an interface (38, 30, 40) for exchanging data between the machine (35, 36, 37) and a connected network (34, 52, 53). The invention also relates to a machine for packing or producing (cigarettes) which has a visual monitoring device for observing areas of the complex machine which are difficult to access or see, said monitoring device being located in the relevant area of the packing machine. This monitoring device records images of the area of the machine which is difficult to access using a line (24) and reproduces said images on a display screen for example, using a camera. The invention also relates to a network (34, 52, 53) of machines of this type, comprising a computer (42) for monitoring the functions of the connected machines (35, 36, 37) and/or a computer (57) for carrying out maintenance and/or defect repair measures on the connected machines (35, 36, 37). Finally, the invention also relates to a method for maintaining and/or diagnosing machines (35, 36, 37). According to this method, data is exchanged with a diagnosis and control computer (42) and/or a service computer (57) via a network (34, 52, 53).

20 Claims, 5 Drawing Sheets

U.S. PATENT DOCUMENTS

| | | | |
|---|---|---|---|
| 4,735,032 A | | 4/1988 | Focke |
| 4,772,128 A | * | 9/1988 | Vinarub et al. .......... 250/227.2 |
| 4,789,947 A | * | 12/1988 | Maciejczak .................. 348/82 |
| 4,852,335 A | | 8/1989 | Focke et al. |
| 4,912,554 A | | 3/1990 | Neri ........................... 358/106 |
| 5,101,609 A | | 4/1992 | Cook ............................. 53/53 |
| 5,208,064 A | | 5/1993 | Becker et al. .................. 427/8 |
| 5,223,683 A | | 6/1993 | Ishizaka .................... 219/8.5 |
| 5,235,649 A | | 8/1993 | Reda ............................ 382/1 |
| 5,241,380 A | * | 8/1993 | Benson et al. .............. 104/295 |
| 5,271,345 A | | 12/1993 | Matschulat et al. .... 112/121.12 |
| 5,309,351 A | * | 5/1994 | McCain et al. ............ 340/3.32 |
| 5,350,033 A | * | 9/1994 | Kraft .......................... 180/167 |
| 5,382,943 A | * | 1/1995 | Tanaka ...................... 340/500 |
| 5,384,588 A | * | 1/1995 | Martin et al. .............. 348/14.1 |
| 5,462,176 A | | 10/1995 | Hereford, et al. ........... 209/577 |
| 5,689,442 A | | 11/1997 | Swanson et al. |
| 5,717,456 A | | 2/1998 | Rudt et al. .................... 348/88 |
| 5,844,601 A | * | 12/1998 | McPheely et al. .......... 348/143 |

FOREIGN PATENT DOCUMENTS

| | | |
|---|---|---|
| DE | 4243206 | 6/1994 |
| DE | 4325325 A1 | 2/1995 |
| DE | 4334745 | 4/1995 |
| DE | 19614920 | 8/1997 |
| EP | 222 258 | 5/1987 |
| EP | 0330495 | 8/1989 |
| EP | 0 391316 A1 | 10/1990 |
| EP | 0 525621 A2 | 2/1993 |
| EP | 0715235 A2 | 6/1996 |
| FR | 2 703 784 | 10/1994 |
| FR | 2 741 438 | 5/1997 |
| GB | 2 259 568 | 3/1993 |
| GB | 2 289 941 | 12/1995 |
| JP | 04329411 | 11/1992 |
| JP | 05236575 | 9/1993 |
| JP | 08317069 | 11/1996 |
| WO | WO 96/27825 | 9/1996 |

* cited by examiner

MACHINE MONITORING APPARATUS CAPABLE OF INCORPORATION INTO A NETWORK

DESCRIPTION

The invention relates to a machine, especially a (cigarette) packaging and/or producing machine, having a number of interacting units assemblies and elements, to a network and to a method for maintaining and/or diagnosing such machines.

Packaging machines, especially cigarette packaging machines but also cigarette producing machines, are characterized by a very complex construction. The interacting units, assemblies and elements, especially folding turret, cigarette magazine, conveyor for cigarettes and packs etc., are constructed and arranged in relation to one another in such a way that the visual detection and monitoring of the movement sequences and the states of individual elements by machine personnel are made extraordinarily difficult. This leads to the situation where faults which develop gradually, in particular contamination of elements or parts of the same, cannot always be detected and stopped in good time. In addition, the maintenance, fault detection and fault rectification of such machines are complicated, because of their complexity.

The invention is therefore based on the object of improving the maintenance of machines of the type mentioned at the beginning. In addition, the invention is based on the object of constructing such machines, specifically in particular packaging machines for cigarettes or the like, in such a way that the working and movement sequences and any developing faults or actual faults can be detected more easily and better.

In order to achieve this object, a machine according to the invention has an interface for exchanging data, especially bidirectionally, between the machine and a network which is or can be connected.

In order to achieve this object, a further (packaging) machine according to the invention is characterized by at least one optical monitoring element—camera—whose optical receiver, especially an objective, is connected to the monitoring element or the camera via an elongate, especially deformable, optical line, the optical receiver, that is to say especially the objective, being arranged at a position which cannot be looked at or is difficult to access.

The object is further achieved by a network comprising one or more such machines and a diagnostic and/or control-desk computer for monitoring the functions of the machines that are connected and/or a service computer for carrying out maintenance and/or fault elimination measures on the machines that are connected.

Finally, the object is achieved by a method for maintaining and/or diagnosing machines, especially (cigarette) packaging and/or producing machines, in which data, in particular audio and/or video data and/or machine data, are exchanged via a network with a diagnostic and/or control-desk computer and/or service computer.

Networking such machines has the advantage that, outside the actual production rooms, on computers which are likewise connected to the network, measures can be carried out which act directly on the machine. For instance, machine data can be interrogated from a control-desk or diagnostic computer, which can be located at any desired distance from the machine. However, from such a control-desk or diagnostic computer it is possible not only to interrogate data relating to the machine but also to feed new data into the machine. This can be of interest, especially in the case of updating software. Finally, control measures on the machine may also be performed from such a control-desk or diagnostic computer. In this case, a camera fitted to the machine can preferably be pivoted and zoomed into specific machines areas. Such a camera adjustment can be carried out manually, especially from the control-desk or diagnostic computer, but also, particularly preferably, automatically on the basis of a fault message relating to the machine and output by a sensor fitted to the machine.

In particular, however, by means of a camera fitted to the machine, it is possible for a video conference with the control-desk computer and diagnostic computer to be set up. In this case, this control-desk or diagnostic computer likewise preferably has an appropriate camera.

However, the network can also have a connection "to the outside". Thus, for example, via a WAN (Wide Area Network), a connection can be made to a computer set up, for example, at the machine manufacturer. This computer is preferably a so-called service computer. It also has the possibility of setting up a video conference. In addition, by means of this service computer, interventions can be made in the machine in the same way as from the control-desk or diagnostic computer.

In this way, maintenance or the elimination of a fault can be carried out from virtually any desired distance. Thus, for example, it is possible for a machine to be set up in Japan while the person carrying out the maintenance is seated in front of a service computer in Germany.

All these advantages may be implemented by the machines mentioned at the beginning being connected to a network by means of an appropriate interface or, in accordance with the method of the invention, by data being exchanged with the diagnostic or control-desk computer and/or the service computer via the network.

In connection with the invention, "network" is to be understood to mean a network with one or more machines and, in particular, at least one computer.

The invention is further based on the finding that the capability of a packaging machine or its efficiency can be increased considerably if developments on the machine which lead to possible faults or faults which actually occur are detected early, and appropriate countermeasures can be taken. This finding is implemented in such a way that optical or visual monitoring elements monitor critical areas of the packaging machine, which cannot be looked at by the operating personnel, or only with a relatively great deal of effort. As a result, on the one hand, faults occurring in such areas can be detected and appropriate countermeasures can be taken. On the other hand, however, an incipient faulty development in particular the increasing contamination of elements which are important to the function, can be recorded and made visible by means of the monitoring element.

According to the invention, the pictures recorded by the monitoring element or by the camera are visualized, preferably on a screen assigned to the (packaging) machine, at best with an enlargement of the recorded detail.

The optical monitoring element according to the invention can also be used to produce still pictures of moving elements and to display them on a screen, in order to make movement sequences, in particular folding steps on packs, visible. The still pictures can be produced with the aid of an illumination system assigned to the monitoring element, using the stroboscopic effect.

According to the invention, the camera for observing hidden or covered areas of the machine is equipped with a deformable fibre-optic cable, that is to say in particular a line with glass fibres. The line can be constructed in such a way that a light-conducting or glass-fibre strand with a recording means, that is to say an objective, at the free end and, if appropriate, a number of light-conducting strands for transmitting light, that is to say for illuminating the area to be observed, are combined to form one line. This line can have different lengths, depending on its use, for example up to 1 meter in length.

Further details of the invention will be explained in more detail below using the exemplary embodiments illustrated in the drawings, in which.

Figure 1:
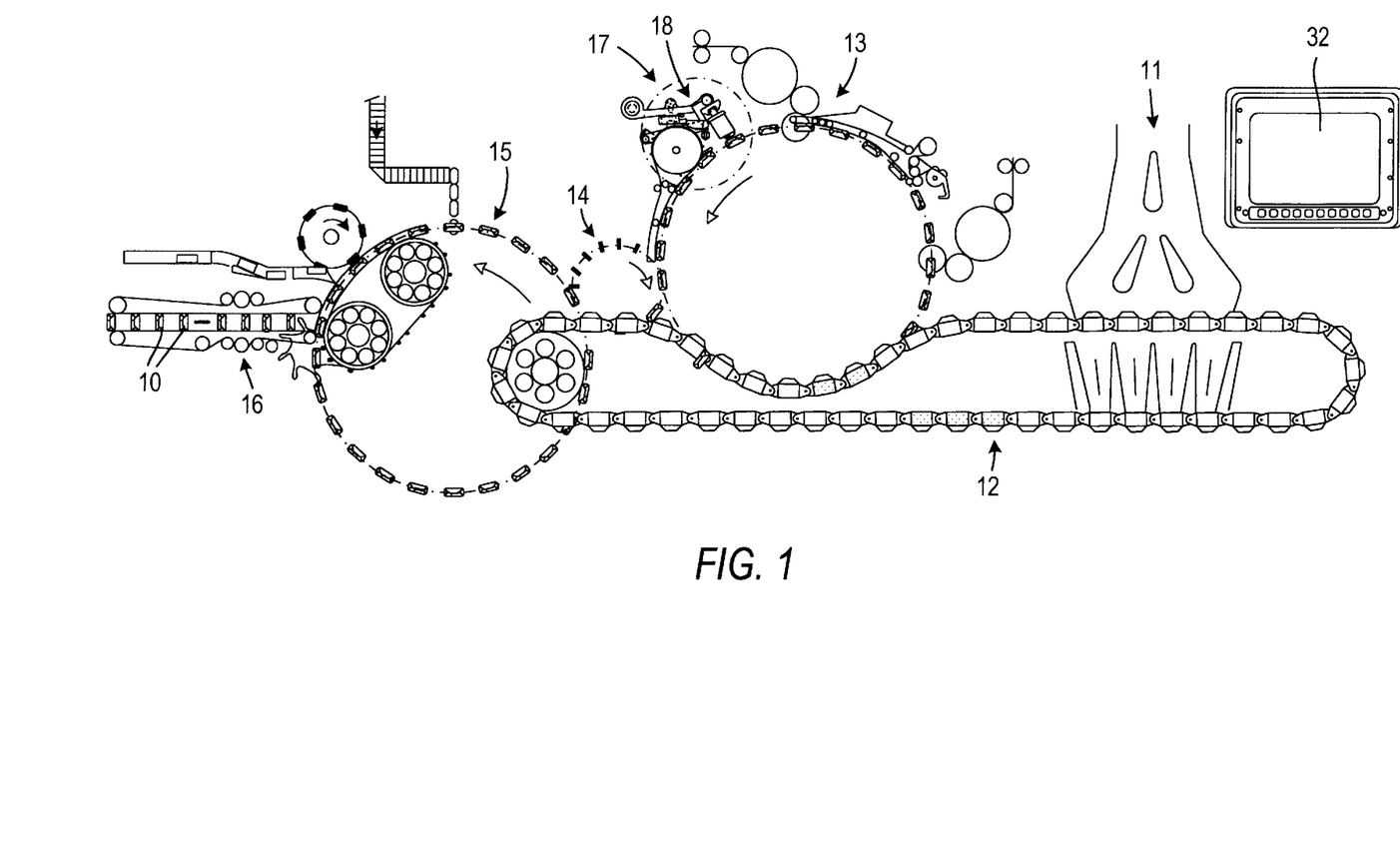
FIG. 1 shows a packaging machine or parts of the same as a preferred application example, in a schematic side view.

The—preferred—exemplary embodiment shown in the drawings deals with a packaging machine, in concrete terms with a cigarette packaging machine for the production of cigarette packs 10 of the soft-carton type. FIG. 1 shows a simplified side view of the construction of the packaging machine. According to this figure, the machine comprises a cigarette magazine 11, a socket chain 12 for transporting groups of cigarettes and a folding turret 13. The latter is connected via a transfer turret 14 to a drying turret 15. In the area of the latter, the finished cigarette packs 10 remain for a certain time in order that glue points can harden. The finished cigarette packs 10 are transported away via a discharge conveyor 16. Details of the packaging machine emerge from U.S. Pat. No. 4,735,032 and U.S. Pat. No. 4,852,335.

The packaging machine has a large number of areas which, during operation, can be subjected to material wear, undesired faults in elements or contamination. The direct visual monitoring and inspection of many areas by the operating personnel of the packaging machine is impossible or possible only with a great deal of effort.

Figure 2:
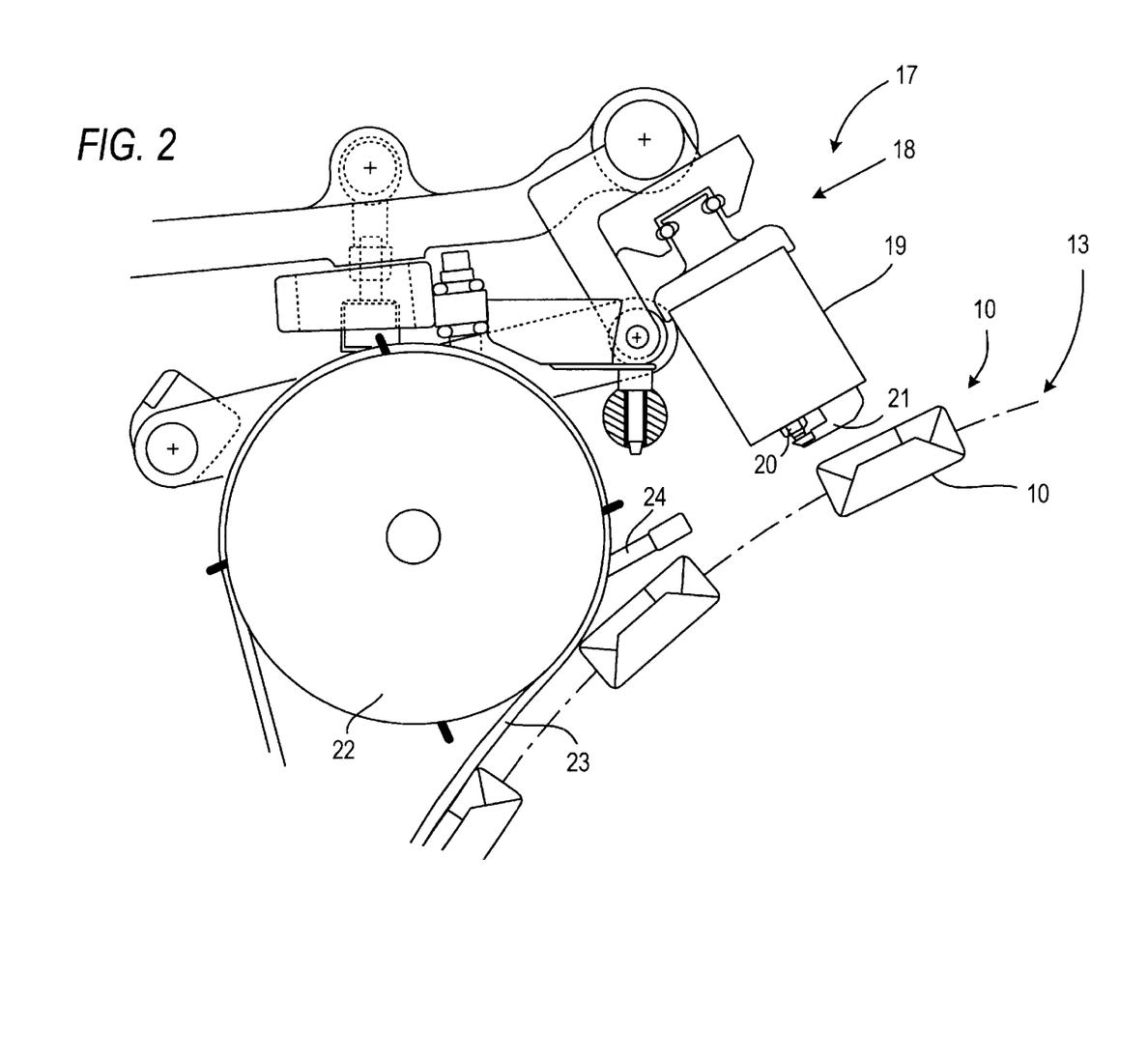
FIG. 2 shows a detail of the packaging machine according to FIG. 1 as a detail, on a much enlarged scale.

The assembly selected as an example of such an area of the packaging machine which is critical and requires monitoring is an assembly which is assigned to the folding turret 13, namely a gluing assembly 18 acting in the area of a gluing station 17. This gluing assembly is positioned in a stationary position directly beside the circular movement path of the folding turret 13 and of the cigarette packs 10. The task of the gluing assembly 18 is to apply glue to specific folding tabs or the cigarette pack 10, specifically in particular point-like glue patterns. For details relating to the construction and functioning of the gluing assembly 18, reference is made to DE 196 48 445.6.

The gluing assembly 18 as one or more gluing nozzles 19. In the present case, the gluing nozzle 19 is constructed in such a way that a nozzle head 20 or a number of nozzle heads 20 located beside one another in the axial direction of the folding turret are arranged on the side facing the folding turret 13 and the cigarette packs 10. Portions of the glue emerge from these nozzle heads. FIG. 2 shows a withdrawn position of the gluing nozzle 19, in which the nozzle head 20 is closed by a closure element 21.

The area of the gluing assembly 18 or the nozzle heads 20 cannot be looked at directly because of the configuration of the packaging machine. Thus, for example, one area is covered by a deflection roll 22, driven in rotation, for supporting belts 23 which, in one circumferential area of the folding turret 13, rest on the outside of the cigarette packs 10. The deflection roll 22 and/or the supporting belts 23 impede the view of the gluing nozzle 19.

In order nevertheless to permit visual monitoring of this sensitive element, a remote monitoring element is installed in this area. This comprises a suitable camera (not shown) and an optical system assigned to the area to be monitored or looked at. Accordingly, this optical system is at a distance from the actual camera. The images recorded by the optical system are led to the camera via a line and therefore converted into pictures.

Figures 3, 4:
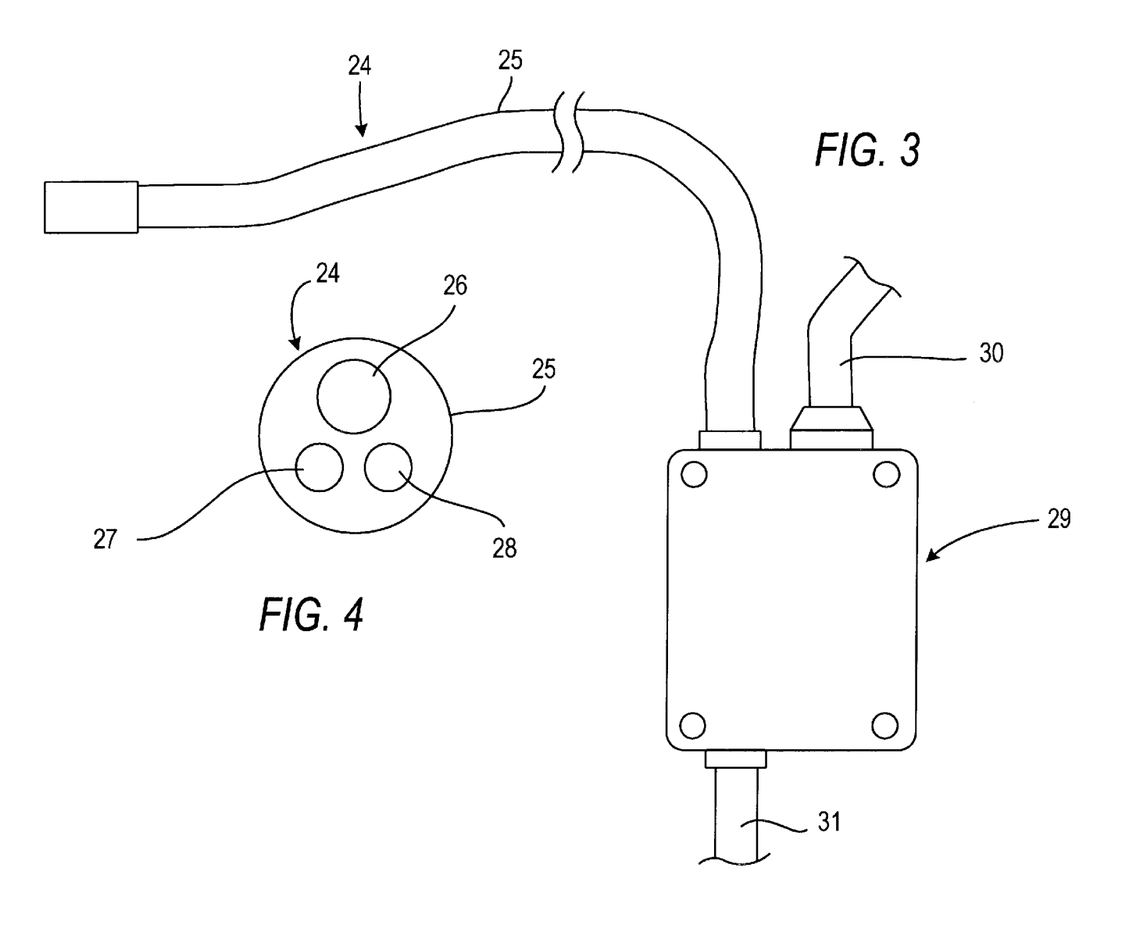
FIG. 3 shows an optical monitoring element for a packaging machine according to FIG. 1 and FIG. 2.
FIG. 4 shows a cross section through a line in the monitoring element according to FIG. 3, on an enlarged scale.

In the present exemplary embodiment, a line 24 leads to the area to be monitored, that is to say in the present case into the vicinity of the gluing assembly 13 or the gluing nozzles 19. At the free end, the line 24 forms an objective, in the simplest case the free end of fibre-optic cables. In the present exemplary embodiment, the line 24 has a multiple function. Provided in an outer covering 25 are a number of fibre-optic cables, three in the present case, with different functions. A recording strand 26 (of greater diameter) captures the image to be recorded by means of an objective formed at the free end or by means of the end surface of optical fibres, in particular glass-fibre strands. In addition, two fibre-optic cables 27, 28 are accommodated in the common covering 25. These likewise preferably consist of glass-fibre strands. The fibre-optic cables 27, 28 are connected to a light source and are used to illuminate the area to be monitored, that is to say in the present case the area of the nozzle heads 20.

The line 24 is connected to a unit 29 of which only the housing is shown in FIG. 3. The unit 29 is used in the present case for forwarding the images recorded, via a connecting line 30, to the camera (not shown) or to another image or signal evaluation unit. The unit 29 can also be used to convert the images recorded into electrical signals, for example via a CCD receiver. Furthermore, a connecting line 31 to a light source (not shown) is connected to the unit 29.

Figure 5:
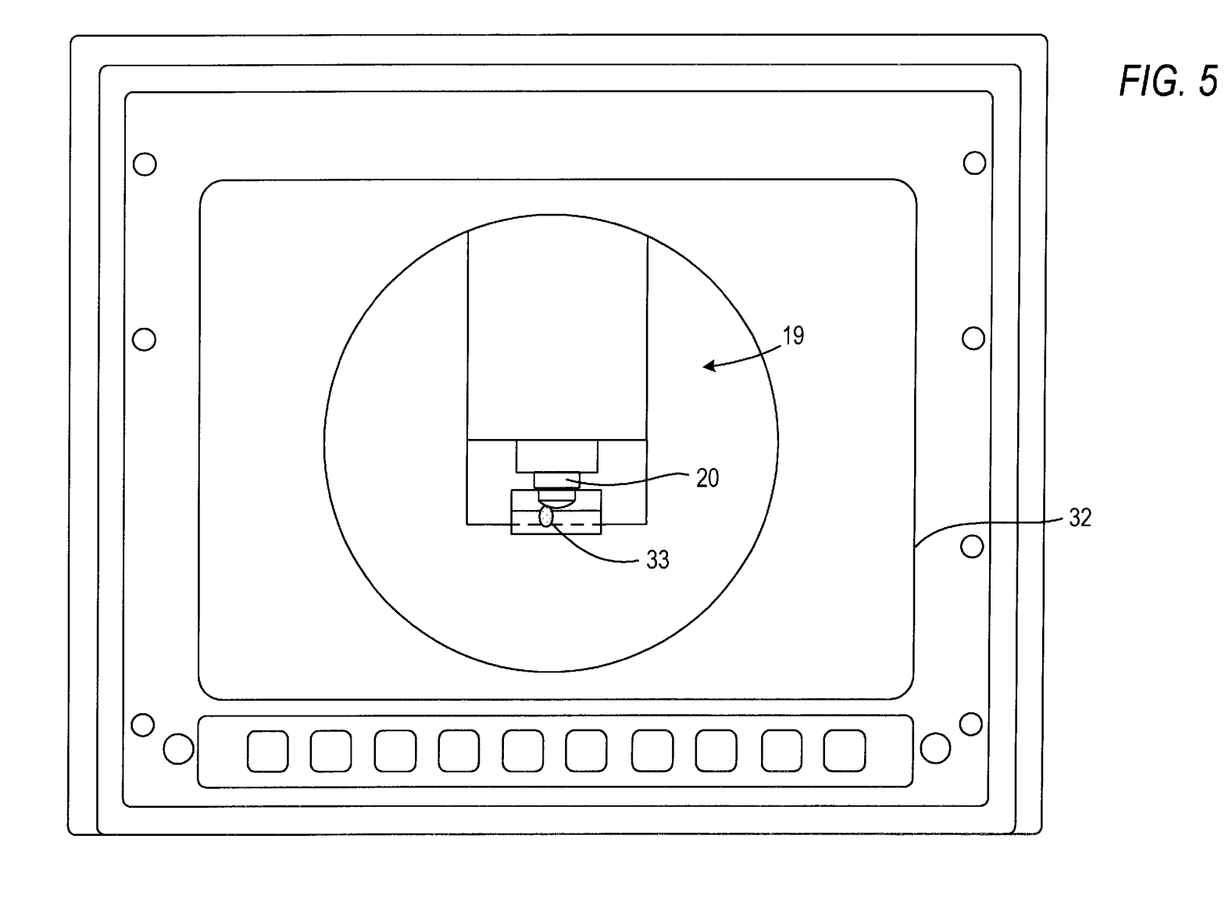
FIG. 5 shows a screen with the enlarged representation of a detail recorded by the monitoring element according to FIG. 3.

The pictures of the observed area recorded by the camera can be displayed on a screen 32 of a monitor assigned to the packaging machine, to be specific preferably as an enlarged picture detail. As an example, FIG. 5 shows the gluing assembly 18 and the enlarged nozzle head 20 with an undesired deposit of glue 33 on the side. This is an indication for the operation of the machine that a critical state is being produced in the area of the gluing assembly 18.

The above-described optical monitoring and observing device enables the production of still pictures, for example in order to inspect high-speed movements during the folding of blanks. The still pictures can be produced by applying the stroboscopic effect, which is known per se. For this purpose, pulsed illumination of the area to be observed is produced via the light source and the fibre-optic cables 27, 28, specifically at the rate at which the machine moves. If the latter operates with a throughput of, for example, 700 cycles per minute, it is accordingly necessary for 700 light cycles to be produced in the area to be observed.

The line 24 is expediently constructed to be deformable by means of appropriate configuration of the covering 25 and of the strands or cables 26, 27 and 28, so that the desired relative position can be formed by means of simple deformation.

Sensors which detect faults are fitted in many areas which are relevant to the packaging operation. If such an area cannot be looked at by an operator, the machine has a camera, for example in the form of the above-described optical monitoring and observing device, which monitors this area. If, then, a fault occurs in this area, a picture of this area is automatically recorded by the camera or the above-described optical monitoring and observing device and displayed on a screen. In this case, in the event that the light is inadequate in this area of the fault, this area is additionally illuminated with the light sources of the camera.

For example, a sensor determines a fault to the effect that glue has been applied to a blank in an unsatisfactory way. The camera or the optical monitoring and observing element is then switched on, if necessary including the associated light sources, so that a picture or pictures of this area can be recorded. These pictures then pass to the aforementioned screen.

Figure 6:
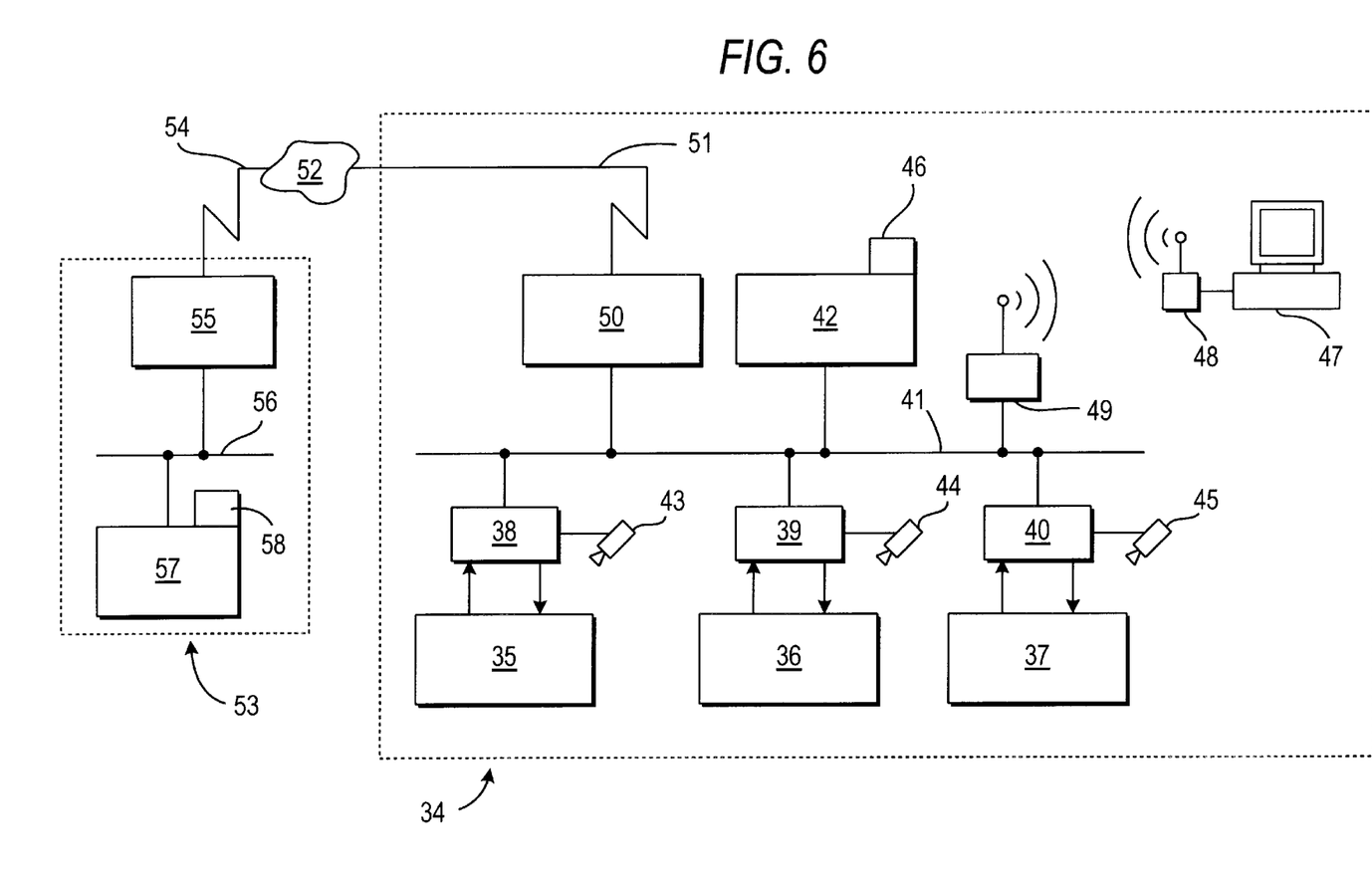
FIG. 6 shows a network comprising a local network with a number of packaging or producing machines, as well as a WAN for using the local network with a service computer.

FIG. 6 shows a local network 34. This network 34 is set up, for example, at a cigarette manufacturer. It has a number of machines 35, 36, 37. These machines 35, 36, 37 are cigarette packaging and/or producing machines.

Each of these machines 35, 36, 37 has a control device 38, 39, 40 for controlling the machines 35, 36, 37. The control system forms an interface to a network cable 41 of the local network 34. In this way, all the machines 35, 36, 37 are connected to a common network cable 41.

The control devices 38, 39, 40 of the machines 35, 36, 37 form—as mentioned—an interface between the machine and the network cable 41 of the local network 34. Via this interface, data are exchanged bidirectionally with the machines 35, 36, 37. In this way, not only is it possible for data to be read out of the machine but it is also possible to intervene in the machine from the outside.

In addition, a control-desk and diagnostic computer 42 is connected to the network cable 41. At this control-desk and diagnostic computer 42, an operator an perform maintenance, diagnostic and fault elimination measures on individual or several machines 35, 36, 37 at the same time. For example, the operator can interrogate machine data and thus establish how many units (packs or cigarettes) have been produced within a shift or any other time interval. However, the operator can also make stipulations for the machines 35, 36, 37, for example in such a way that a specific number of units are to be produced within a specific time interval. By means of the control-desk and diagnostic computer 42, it is also possible for updated software to be downloaded to the machine control systems 38, 39, 40. However, the operator can also interrogate machine states from this computer 42. For example, in this way he receives information about faults. From the control-desk and diagnostic computer 42, he can then take measures to eliminate faults of this type. In specific terms, it is possible for a fault to be rectified remotely to a certain extent, even without corresponding manual actions on site.

If, however, it should not be possible for a fault to be rectified remotely, a video conferencing system 43, 44, 45 installed on each machine, and a corresponding video conferencing system 46 on the control-desk and diagnostic computer 42 offers the operators at the control-desk and diagnostic computer 42 and the respective machine 35, 36, 37 the possibility of audio-visual communication. These video conferencing systems 43, 44, 45, 46 each have a microphone and a camera. In particular, a video conferencing system of this type also permits the transmission of pictures from the machine 35, 36, 37 to a screen on the control-desk and diagnostic computer. The latter operator does not then specifically have to go to the machine in order to view the relevant fault on site. Instead, the operator can take suitable measures, from the control-desk and diagnostic computer 42, in order to eliminate a fault which has occurred. If manual actions are necessary for this, he advises the operator of the machine 35, 36, 37 to carry these out.

Also connected to the control devices 38, 39, 40 of the machine 35, 36, 37 are units 29, which supply pictures of areas which cannot be looked at directly by an operator. These pictures can also be transmitted to the control-desk and diagnostic computer 42 via the network 34.

For further diagnostic measures, a further mobile computer 47, for example a laptop, is provided. This mobile computer 47 has a transmitting and receiving device 48 for operating a wire-free connection to the network 34. The mobile computer 47 can communicate with a the local network 34 via a further wire-free transmitting and receiving device 49 connected to the network cable 41 of the local network 34. From this mobile computer 47, the same functions can then be carried out as those from the control-desk and diagnostic computer 42. This increases the flexibility of maintenance and diagnostic measures. In this way, the operator responsible for maintenance and diagnosis can carry out his work from any desired work station or location. In particular, in difficult cases when he must nevertheless view the machine 35, 36, 37 on site, he can take the mobile computer 47 with him and use it on site. This has the advantage that this operator can maintain his accustomed computer environment.

In addition to the mobile computer 47, which is connected via a transmitting and receiving device 48 to a further transmitting and receiving device 49 with the network cable, for a wire-free connection, it is also possible for the machines 35, 36, 37 and their control systems 36, 39, 40 to be connected via wire-free transmitting and receiving devices.

In addition, a so-called server 50 is connected to the network cable 41. Implemented on this server 50 is a database with data about the entire network 34, including all its previously described components. In addition, the server 50 is used for communication with external networks.

Via a connection 51, the server 50 and therefore the entire network 34 is connected to a WAN (Wide Area Network) 52. This connection comprises, for example, a modem, ISDN, radio and/or satellite connection. The WAN 52 is, for example, the Internet (or WWW, that is to say the World Wide Web) or else other relatively large internal company networks.

Also connected to the WAN 52 is a further local network 53, specifically likewise via a connection 54, which can be a connection according to the connection 51.

The local network 53 likewise has a network server 55, which produces a connection to further network computers via a network cable 56. The server 55 essentially corresponds to the server 50, so that to this extent reference is made to the server 50. In particular, the server 55 likewise has a database and communication means, in order to permit communication between the local network 53 and the WAN 52. The network cable 56 provides a connection to the service computer 57, which is likewise equipped with a video conferencing system 58.

The service computer 57 offers the same functions as the control-desk and diagnostic computer 42, so that to this extent reference is made to this control-desk and diagnostic computer 42. However, by comparison with the control-desk and diagnostic computer 42, the service computer 57 in addition offers the possibility of communicating with the machines 35, 36, 37 over a very great distance, specifically essentially as far as the WAN reaches, and if necessary of intervening in these machines.

| List of reference symbols | |
|---|---|
| 10 | Cigarette pack |
| 11 | Cigarette magazine |
| 12 | Pocket chain |
| 13 | Folding turret |
| 14 | Transfer turret |
| 15 | Drying turret |
| 16 | Discharge conveyor |
| 17 | Gluing station |
| 18 | Gluing assembly |
| 19 | Gluing nozzle |
| 20 | Nozzle head |
| 21 | Closure element |
| 22 | Deflection roll |
| 23 | Supporting belt |
| 24 | Line |
| 25 | Covering |
| 26 | Recording strand |
| 27 | Fibre-optic cable |
| 28 | Fibre-optic cable |
| 29 | Unit |
| 30 | Connecting line |
| 31 | Connecting line |
| 32 | Screen |
| 33 | Glue deposit |
| 34 | Local network |
| 35 | Machine |
| 36 | Machine |
| 37 | Machine |
| 38 | Control device |
| 39 | Control device |
| 40 | Control device |
| 41 | Network cable |
| 42 | Control-desk and diagnostic computer |
| 43 | Video conferencing system |
| 44 | Video conferencing system |
| 45 | Video conferencing system |
| 46 | Video conferencing system |
| 47 | Mobile computer |
| 48 | Transmitting and receiving device |
| 49 | Transmitting and receiving device |
| 50 | Server |
| 51 | Connection |
| 52 | WAN |
| 53 | Local network |
| 54 | Connection |
| 55 | Server |
| 56 | Network cable |
| 57 | Service computer |
| 58 | Video conferencing system |

What is claimed is:

1. A cigarette producing machine including a plurality of interacting units with an apparatus for optically monitoring an area of at least one of said units that is not readily accessible for direct observation, the apparatus comprising:
   an optical receiver for receiving light reflected from said area;
   a monitoring device at a location remote from said optical receiver for forming at said location a picture of said area from said reflected light; and
   an elongated, deformable optical line having at one end thereof said optical receiver and being connected to said monitoring device, wherein said optical line includes a fiber optic cable for conducting light from a light source to illuminate said area and a light-conducting strand for transmitting reflected light from said receiver to said monitoring device, said optical line being deformed into a configuration bringing said optical receiver into a desired position relative to said area to be monitored.

2. The machine according to claim 1, wherein said optical line includes plural said fiber optic cables.

3. The machine according to claim 2, wherein said optical line includes said light conducting strand and said fiber optic cables in a common cover.

4. The machine according to claim 1, wherein said monitoring device comprises a screen for displaying said picture of said area to an operator.

5. The machine according to claim 4, wherein said monitoring device can display an enlarged view of said area on said screen.

6. The machine according to claim 1, wherein said area includes a gluing assembly having at least one glue nozzle and associated nozzle head for applying glue to folding tabs of cigarette packages, said optical receiver being positioned to receive light reflected from said nozzle head to form a picture thereof at said monitoring device.

7. The machine according to claim 1, further comprising:
   an interface for exchanging information between said machine and a network connected thereto; and
   a first audio/video system associated with said machine for exchanging video and audio data via said interface to provide communication between a machine operator and a second audio/video system connected to said network, wherein each of said first and second audio/video systems includes a microphone and said first audio/video system includes a camera for monitoring an area of said machine, said interface enabling exchange between said machine and said network of machine data including at least an image captured by said camera and of control commands for adjusting said camera.

8. A cigarette producing machine including a plurality of interacting units with an apparatus for optically monitoring an area of at least one of said units that is not readily accessible for direct observation, the apparatus comprising:
   an optical receiver for receiving light reflected from said area;
   a monitoring device at a location remote from said optical receiver for forming at said location a picture of said area from said reflected light; and
   an elongated, deformable optical line having at one end thereof said optical receiver and being connected to said monitoring device, wherein said optical line includes a fiber optic cable for conducting light from a light source to illuminate said area and a light-conducting strand for transmitting reflected light from said receiver to said monitoring device, said optical line being deformed into a configuration bringing said optical receiver into a desired position relative to said area to be monitored;
   sensors for detecting malfunctions of said units; and
   a control system for activating said monitoring device only when one of said sensors detects a malfunction in said area, wherein said control system includes a recording device for recording one or more images of said area.

9. The machine according to claim 8, wherein said control system includes a switching device for activating said light source for illuminating said area only when a malfunction has been detected thereat, wherein said control system deactivates said light when said images have been recorded.

10. The machine according to claim 8, wherein said control system includes an adjusting device for positioning said optical receiver in accordance with locations of malfunctions detected by said sensors.

11. A cigarette producing machine including a plurality of interacting units with an apparatus for optically monitoring an area of at least one of said units, the apparatus comprising:
   an optical receiver for receiving light reflected from said area;
   a monitoring device connected to said optical receiver for forming a picture of said area from said reflected light;
   a pulsating illuminating device for illuminating said area at a predetermined period of pulsation; and
   an elongated, deformable optical line having at one end thereof said optical receiver and being connected to said monitoring device, wherein said optical line includes a fiber optic cable for conducting light from said illuminating device to illuminate said area and a light-conducting strand for transmitting reflected light from said receiver to said monitoring device, said optical line being deformed into a configuration bringing said optical receiver into a desired position relative to said area to be monitored.

12. The machine according to claim 11, wherein said optical line includes said light conducting strand and said fiber optic cable in a common cover.

13. The machine according to claim 11, wherein said predetermined period is synchronized with a cycle of motion of the unit.

14. The machine according to claim 11, wherein said monitoring device comprises a screen for displaying said picture of said area to an operator.

15. The machine according to claim 14, wherein said monitoring device can display an enlarged view of said area on said screen.

16. The machine according to claim 11, wherein said area includes a gluing assembly having at least one glue nozzle and associated nozzle head for applying glue to folding tabs of cigarette packages, said optical receiver being positioned to receive light reflected from said nozzle head to form a picture thereof at said monitoring device.

17. The machine according to claim 11, further comprising:
   an interface for exchanging information between said machine and a network connected thereto; and
   a first audio/video system associated with said machine for exchanging video and audio data via said interface to provide communication between a machine operator and a second audio/video system connected to said network, wherein each of said first and second audio/video systems includes a microphone and said first audio/video system includes a camera for monitoring an area of said machine, said interface enabling exchange between said machine and said network of machine data including at least an image captured by said camera and of control commands for adjusting said camera.

18. A cigarette producing machine including a plurality of interacting units with an apparatus for optically monitoring an area of at least one of said unit, the apparatus comprising:
   an optical receiver for receiving light reflected from said area;
   a monitoring device at a location remote from said area for forming at said location a picture of said area from said reflected light;
   a pulsating illuminating device for illuminating said area at a predetermined period of pulsation; and
   an elongated, deformable optical line having at one end thereof said optical receiver and being connected to said monitoring device, wherein said optical line includes a fiber optic cable for conducting light from said illuminating device to illuminate said area and a light-conducting strand for transmitting reflected light from said receiver to said monitoring device, said optical line being deformed into a configuration bringing said optical receiver into a desired position relative to said area to be monitored;
   sensors for detecting malfunctions of said units; and
   a control system for activating said monitoring device only when one of said sensors detects a malfunction in said area, wherein said control system includes a recording device for recording one or more images of said area.

19. The machine according to claim 18, wherein said control system includes a switching device for activating said illuminating device only when a malfunction has been detected thereat, wherein said control system deactivates said illuminating device when said images have been recorded.

20. The machine according to claim 18, wherein said control system includes an adjusting device for positioning said optical receiver in accordance with locations of malfunctions detected by said sensors.

* * * * *